(12) United States Patent
Fan et al.

(10) Patent No.: US 9,733,150 B2
(45) Date of Patent: Aug. 15, 2017

(54) WATER RESISTANCE INSPECTION SYSTEM AND INSPECTION METHOD

(71) Applicant: HTC Corporation, Taoyuan (UA)

(72) Inventors: Shen-Chun Fan, Taoyuan (TW); Chien-Chuan Ko, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 197 days.

(21) Appl. No.: 14/591,589

(22) Filed: Jan. 7, 2015

(65) Prior Publication Data
US 2015/0369690 A1 Dec. 24, 2015

Related U.S. Application Data

(60) Provisional application No. 62/016,102, filed on Jun. 24, 2014.

(51) Int. Cl.
*G01M 3/02* (2006.01)
*G01M 3/34* (2006.01)
*G01M 3/32* (2006.01)

(52) U.S. Cl.
CPC ............ *G01M 3/34* (2013.01); *G01M 3/3272* (2013.01)

(58) Field of Classification Search
CPC ............ G01M 3/02; G01M 3/34; G01M 3/00; G01M 3/3272; G01N 15/08
See application file for complete search history.

(56) References Cited

U.S. PATENT DOCUMENTS

| 5,641,455 A | * | 6/1997 | Rosenlund | A61L 2/206 422/110 |
| 7,904,259 B2 | | 3/2011 | Shinoda | |
| 2002/0001462 A1 | | 1/2002 | Ho | |
| 2003/0116201 A1 | * | 6/2003 | Pabst | F04F 5/52 137/565.23 |
| 2006/0081036 A1 | * | 4/2006 | Lehmann | G01M 3/3281 73/49.3 |

(Continued)

FOREIGN PATENT DOCUMENTS

| CN | 1071252 A | 4/1993 |
| CN | 101089576 A | 12/2007 |

(Continued)

*Primary Examiner* — Nguyen Ha
(74) *Attorney, Agent, or Firm* — Birch, Stewart, Kolasch & Birch, LLP

(57) ABSTRACT

An inspection method for inspecting the water resistance of an electronic device is provided, including providing a vacuum generator, using the vacuum generator to pump air out of the electronic device, stopping the pumping of air out of the electronic device when the air pressure in the electronic device is less than a predetermined pressure value, measuring the air pressure in the electronic device as a first pressure value after the pumping of air out of the electronic device has been stopped for a predetermined time, calculating the pressure difference D by subtracting a second pressure value from the predetermined pressure value, calculating the pressure difference d by subtracting the second pressure value from the first pressure value, and determining whether the electronic device is waterproof or not according to the pressure differences D and d.

15 Claims, 6 Drawing Sheets

(56) References Cited

U.S. PATENT DOCUMENTS

| | | | | |
|---|---|---|---|---|
| 2012/0125085 A1* | 5/2012 | Wu | ................ | G01M 3/329 |
| | | | | 73/38 |
| 2012/0188085 A1* | 7/2012 | Jatcko | .................... | G01M 3/34 |
| | | | | 340/605 |
| 2015/0077738 A1* | 3/2015 | Hughes | .............. | G01B 11/0691 |
| | | | | 356/72 |
| 2015/0369691 A1* | 12/2015 | Pan | .................... | G01M 3/3272 |
| | | | | 73/40 |
| 2015/0373469 A1* | 12/2015 | Pan | .................... | H04R 29/001 |
| | | | | 381/59 |

FOREIGN PATENT DOCUMENTS

| | | | | | |
|---|---|---|---|---|---|
| CN | 102175404 | A | | 9/2011 | |
| CN | 103017890 | A | | 4/2013 | |
| CN | 103674441 | A | | 3/2014 | |
| CN | 205117839 | U | * | 3/2016 | ................ F04F 5/20 |
| DE | 10338876 | A1 | * | 3/2004 | .......... G01M 3/3281 |
| JP | 2000-241286 | A | | 9/2000 | |
| JP | 2005300392 | A | * | 10/2005 | .............. G01M 3/26 |
| TW | 200907320 | A | | 2/2009 | |
| TW | M485891 | U | | 9/2014 | |

* cited by examiner

WATER RESISTANCE INSPECTION SYSTEM AND INSPECTION METHOD

CROSS REFERENCE TO RELATED APPLICATIONS

This Application also claims priority of U.S. Provisional Application No. 62/016,102, filed on Jun. 24, 2014, the entirety of which is incorporated by reference herein.

BACKGROUND OF THE INVENTION

Field of the Invention

The application relates in general to an inspection system and inspection method, and in particular to an inspection system and inspection method for water resistance inspection of an electronic device.

Description of the Related Art

With the progress of technology, a lot of waterproof electronic devices have been provided (for example, a waterproof smartphone or digital camera). The function of being waterproof can fail because of unexpected gaps generated by poor fabrication or collisions during delivery. However, there still seems to be no effective method nowadays for inspecting the water resistance of an electronic device.

BRIEF SUMMARY OF INVENTION

To address the deficiencies of conventional inspection methods, an embodiment of the invention provides an inspection method for water resistance inspection of an electronic device, including providing a vacuum generator, using the vacuum generator to pump air out of the electronic device, stopping the pumping of air out of the electronic device when the air pressure in the electronic device is less than a predetermined pressure value, measuring the air pressure in the electronic device as a first pressure value after the pumping of air out of the electronic device has been stopped for a predetermined time, calculating a pressure difference D by subtracting a second pressure value from the predetermined pressure value, calculating a pressure difference d by subtracting the second pressure value from the first pressure value, and determining whether the electronic device is waterproof or not according to the pressure differences D and d.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the inspection system and inspection method are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
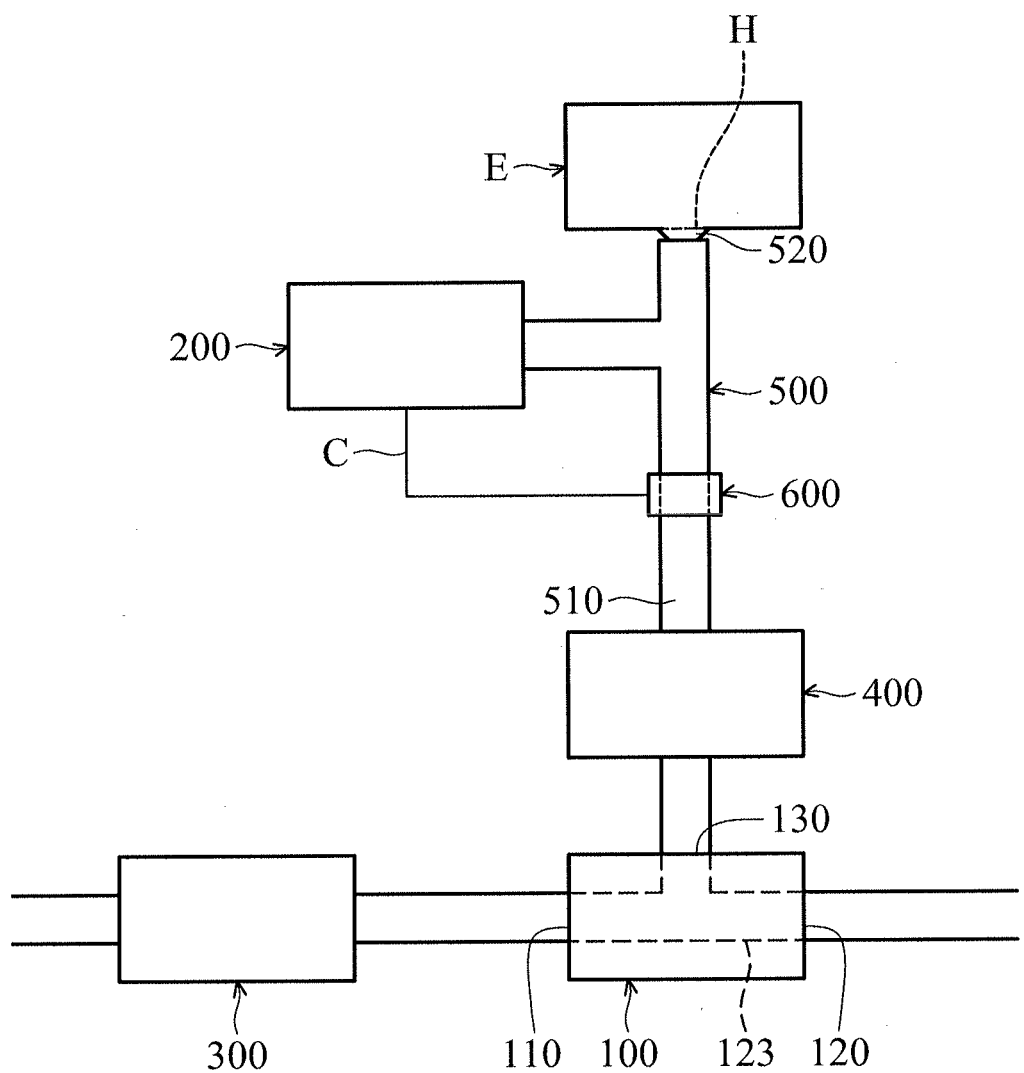
FIG. 1 is a schematic diagram of an inspection system according to an embodiment of the invention.

According to an embodiment of the invention, FIG. 1 shows an inspection system which can be used for water resistance inspection of an electronic device E (for example, a smartphone or a tablet computer). The inspection system primarily comprises a vacuum generator 100, a measuring device 200, an air pressure control unit 300, a flow control unit 400, a connecting tube 500, and a solenoid valve 600. A T-shaped passage 123 is formed in the vacuum generator 100, and an inlet port 110, an outlet port 120, and a suction port 130 are respectively formed on the ends thereof.

The air pressure control unit 300 connects to the inlet port 110, and the flow control unit 400 connects to the suction port 130. The outlet port 120 communicates with the external environment. The aforementioned connecting tube 500 has a first end 510 and a second end 520, wherein the first end 510 connects to the flow control unit 400, and the second end 520 connects to an electronic device E through a suction disc structure. Moreover, the measuring device 200 is connected to the connecting tube 500 to measure the air pressure in the electronic device E. In this embodiment, the solenoid valve 600 is disposed on the connecting tube 500 and electrically connected to the measuring device 200 by a wire C. In some embodiments, the solenoid valve 600 may be disposed between the flow control unit 400 and the vacuum generator 100, or incorporated into the flow control unit 400.

Figure 2:
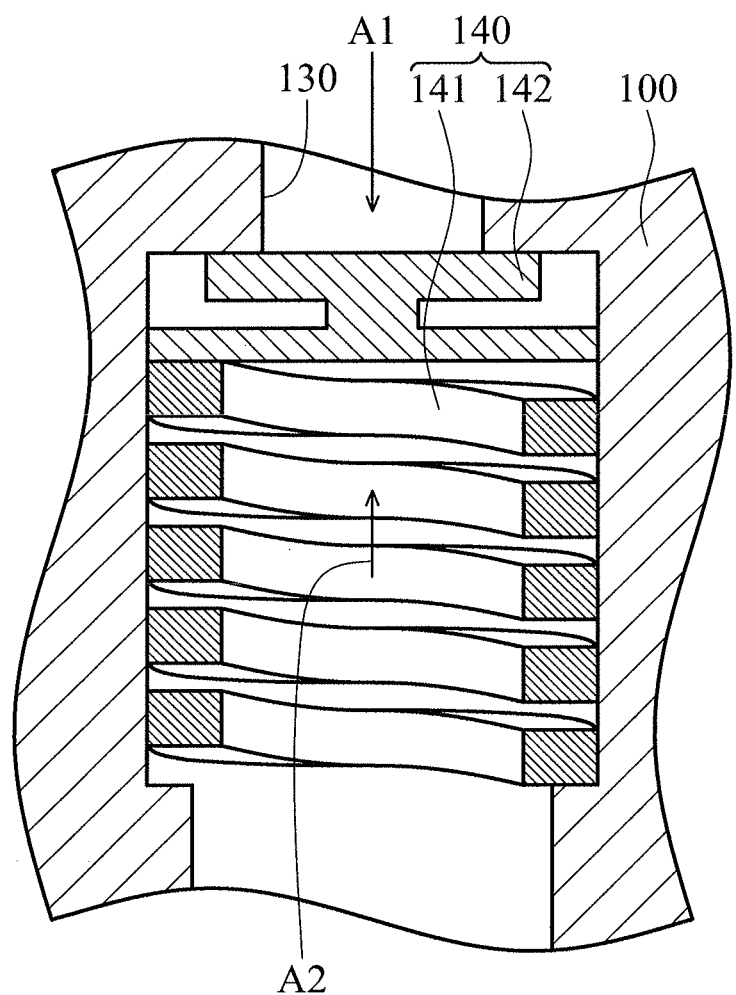
FIG. 2 is a schematic diagram of a check valve in a vacuum generator according to an embodiment of the invention.

Referring to FIG. 2, in this embodiment, the vacuum generator 100 comprises a check valve 140 disposed on the suction port 130. The check valve 140 includes an elastic member 141 and a sealing member 142, wherein the elastic member 141 provides an elastic force to the sealing member 142, such that the air inside the vacuum generator 100 cannot flow into the suction port 130. When the air pressure inside the suction port 130 (the direction indicated by arrow A1) exceeds the elastic force of the elastic member 141 (the direction indicated by arrow A2), the air inside the suction port 130 can flow into the vacuum generator 100.

Figure 3:
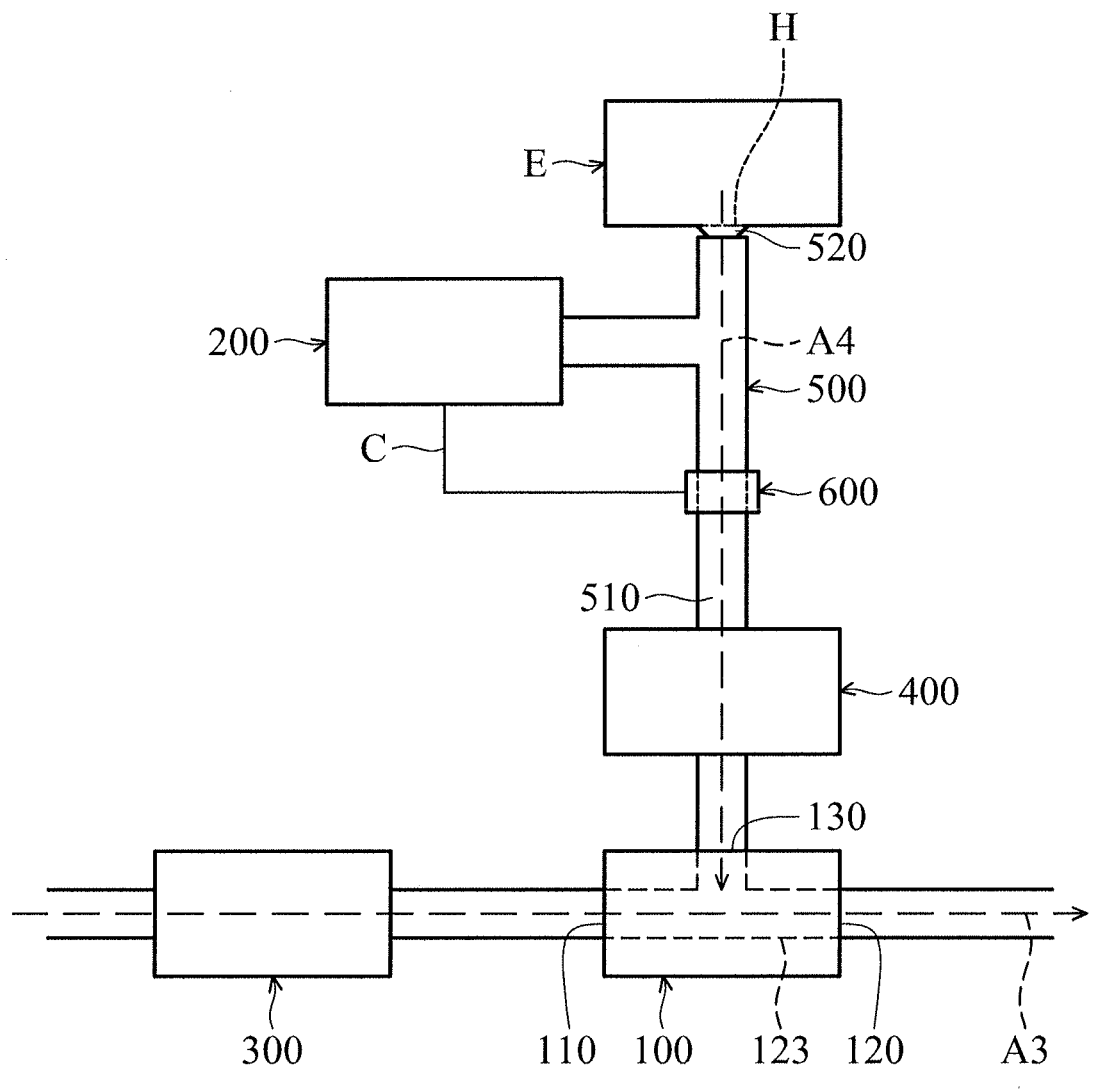
FIG. 3 is a schematic diagram representing an air flow path during operation of the vacuum generator according to an embodiment of the invention.

Referring to FIG. 3, the user can connect the suction disc structure at the second end 520 with a test hole H of the electronic device E for water resistance inspection of the electronic device E, wherein the test hole H communicates with the inner space of the electronic device E. It should be noted that, in this embodiment, the second end 520 can tightly connect to the test hole H by the suction disc structure, so as to prevent the air in the external environment from flowing into the connecting tube 500 through the gap between the second end 520 and the test hole H.

Subsequently, the vacuum generator 100 can be enabled, such that the external air enters the vacuum generator 100 through the air pressure control unit 300 and the inlet port 110, and is discharged through the outlet port 120 (the direction indicated by arrow A3 in FIG. 3). Due to a negative pressure formed in the vacuum generator 100, the air in the electronic device E sequentially flows through the connecting tube 500, the flow control unit 400, and the suction port 130 to the vacuum generator 100 (the direction indicated by arrow A4 in FIG. 3), and the air is finally discharged from the vacuum generator 100 through the outlet port 120.

The air pressure control unit 300 can control the pressure of the external air entering the vacuum generator 100, such that the external air can flow through the inlet port 110 in a stable flow velocity. The flow control unit 400 can control the flow rate of the air when entering the vacuum generator 100, such that the inaccuracy of the air pressure measured by the measuring device 200 due to the excessive flow rate can be prevented.

It should be noted that a film is disposed on the aforementioned test hole H of the electronic device E, wherein the film is breathable and water proof. Therefore, air in the electronic device E can flow smoothly into the connecting tube 500 through the test hole H during the inspection, and the test hole H does not need to be sealed by additional components when the inspection is finished. The film may comprise polytetrafluoroethylene (PTFE) or expanded polytetrafluoroethylene (ePTFE), however the invention is not limited thereto.

When the vacuum generator 100 keeps pumping air out of the electronic device E, the measuring device 200 continuously measures the air pressure at the second end 520 of the connecting tube 500. The air pressure at the second end 520 is substantially the same as the air pressure in the electronic device E, such that the air pressure at the second end 520 can be deemed to be the air pressure in the electronic device E in the invention. When the air pressure measured by the measuring device 200 is less than a predetermined pressure value, the measuring device transmits an electronic signal to the solenoid valve 600, and the solenoid valve 600 closes to block the air transfer between the electronic device E and the vacuum generator 100. In other words, the air in the electronic device E is stopped pumping out therefrom.

After the air in the electronic device E is stopped pumping out therefrom with the electronic device E and the connecting tube 500 remaining in a connecting state for a predetermined time, the air pressure value (first pressure value) measured by the measuring device 200 can be read again, and compare this air pressure value with the predetermined pressure value to determine whether the electronic device E conforms to the required water resistance. For example, the predetermined pressure value minus a second pressure value (the air pressure in the electronic device E before pumping, usually 1 atm) leaves a pressure difference D, and the first pressure value minus the second pressure value leaves a pressure difference d. The pressure difference D is −10 kPa and the predetermined time is 10 seconds. If the pressure difference d is less than −9 kPa, the electronic device E can be determined that it conforms to IPX7 of the IP Ratings (Ingress Protection Ratings). Otherwise, the electronic device E does not conform to the aforementioned IP Ratings. It should be noted that the pressure difference D can be adjusted according to the needed IP Ratings, usually −10 kPa to −100 kPa, wherein −10 kPa simulates the pressure at 1 meter below the water surface, and −100 kPa simulates the pressure at 10 meters below the water surface. The pressure difference d is substantially 90% of the pressure difference D.

Figure 4:
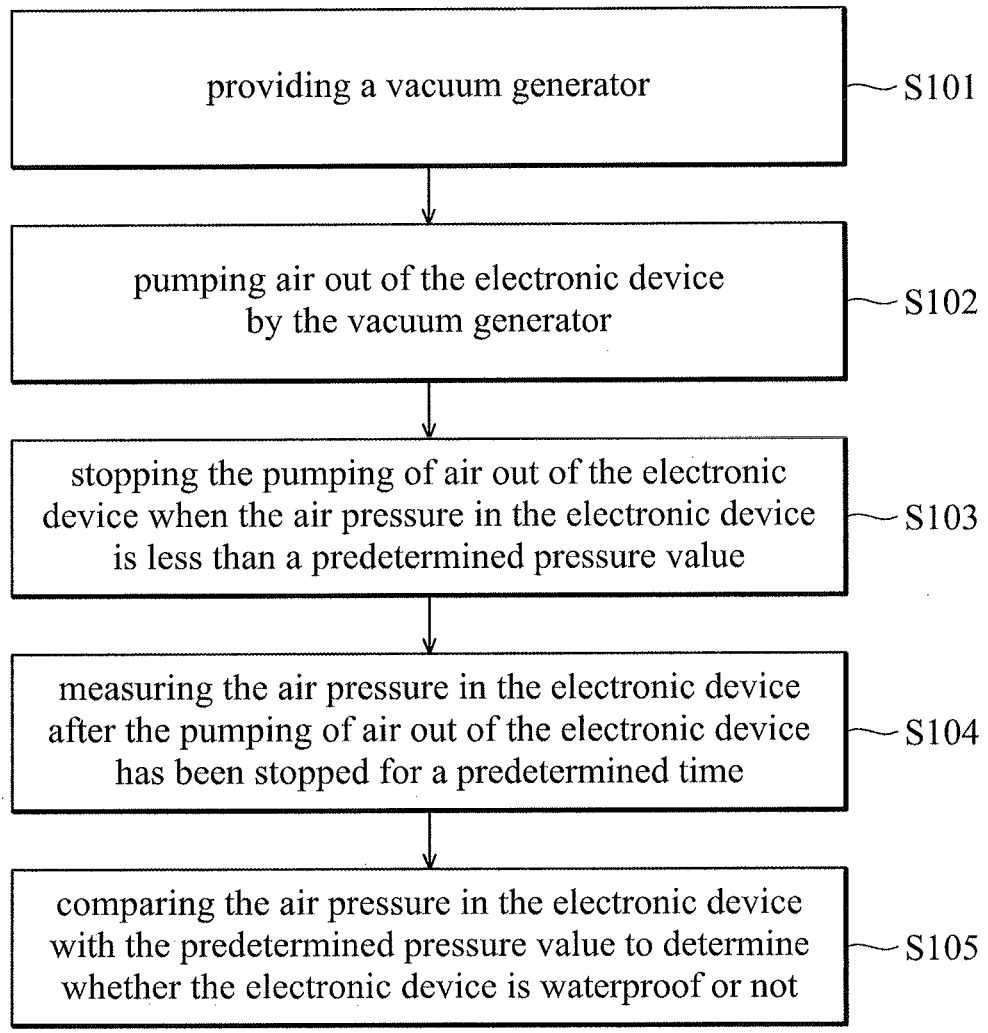
FIG. 4 is a flow chart of an inspection method according to an embodiment of the invention.

Referring to FIGS. 3 and 4, according to the schematic configuration shown in FIG. 3, an inspection method for water resistance inspection of the electronic device E is provided in the invention. As shown in FIG. 4, the first step is providing a vacuum generator 100 (step S101), and the next is pumping air out of the electronic device E using this vacuum generator 100 (step S102). For example, external air can be introduced into the vacuum generator 100 through the inlet port 110 (FIG. 3), and the external air is discharged from the vacuum generator 100 through an outlet port 120, such that the air in the electronic device E flows through a suction port 130 into the vacuum generator 100 due to the negative pressure formed by the vacuum generator 100. Furthermore, in an embodiment, an air pressure control unit 300 and a flow control unit 400 may also be provided (FIG. 3), wherein the air pressure control unit 300 connects to the inlet port 110 to control the pressure of the external air entering the vacuum generator 100, and the flow control unit 400 is disposed between the electronic device E and the vacuum generator 100 to control the flow rate of the air from the electronic device E to the vacuum generator 100.

The next step is stopping the pumping of air out of the electronic device E when the air pressure in the electronic device is less than a predetermined pressure value (step S103). In this embodiment, a measuring device 200 for measuring the air pressure in the electronic device E can be provided (FIG. 3), and a solenoid valve 600 can be disposed between the electronic device E and the vacuum generator 100. When the air pressure in the electronic device E is less than the predetermined pressure value, the measuring device 200 transmit an electronic signal to the solenoid valve 600, and the solenoid valve 600 closes to block the air transfer between the electronic device E and the vacuum generator 100.

After the pumping of air out of the electronic device E has been stopped for a predetermined time, the air pressure in the electronic device E can be measured (step S104). The final step is comparing the air pressure in the electronic device E with the predetermined pressure value to determine whether the electronic device E is waterproof or not (step S105). For example, the pressure difference D between the predetermined pressure value and the atmospheric pressure can be calculated, the pressure difference d between the air pressure in the electronic device E and the atmospheric pressure can be calculated, and the electronic device is waterproof or not can be determined according to the pressure differences D and d.

Figure 5:
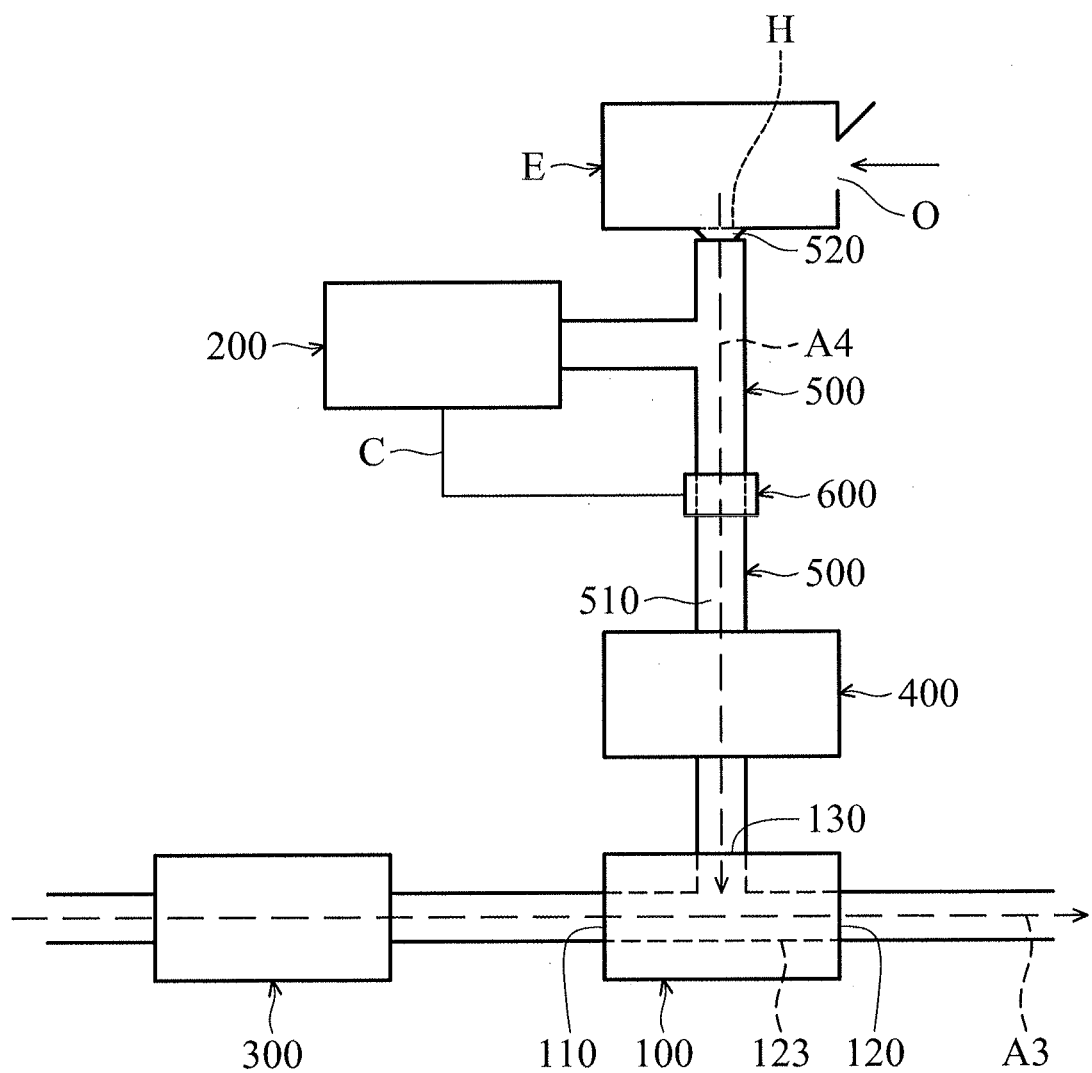
FIG. 5 is a schematic diagram showing that an opening in an electronic device is open and connected to an inspection system according to another embodiment of the invention.
Figure 6:
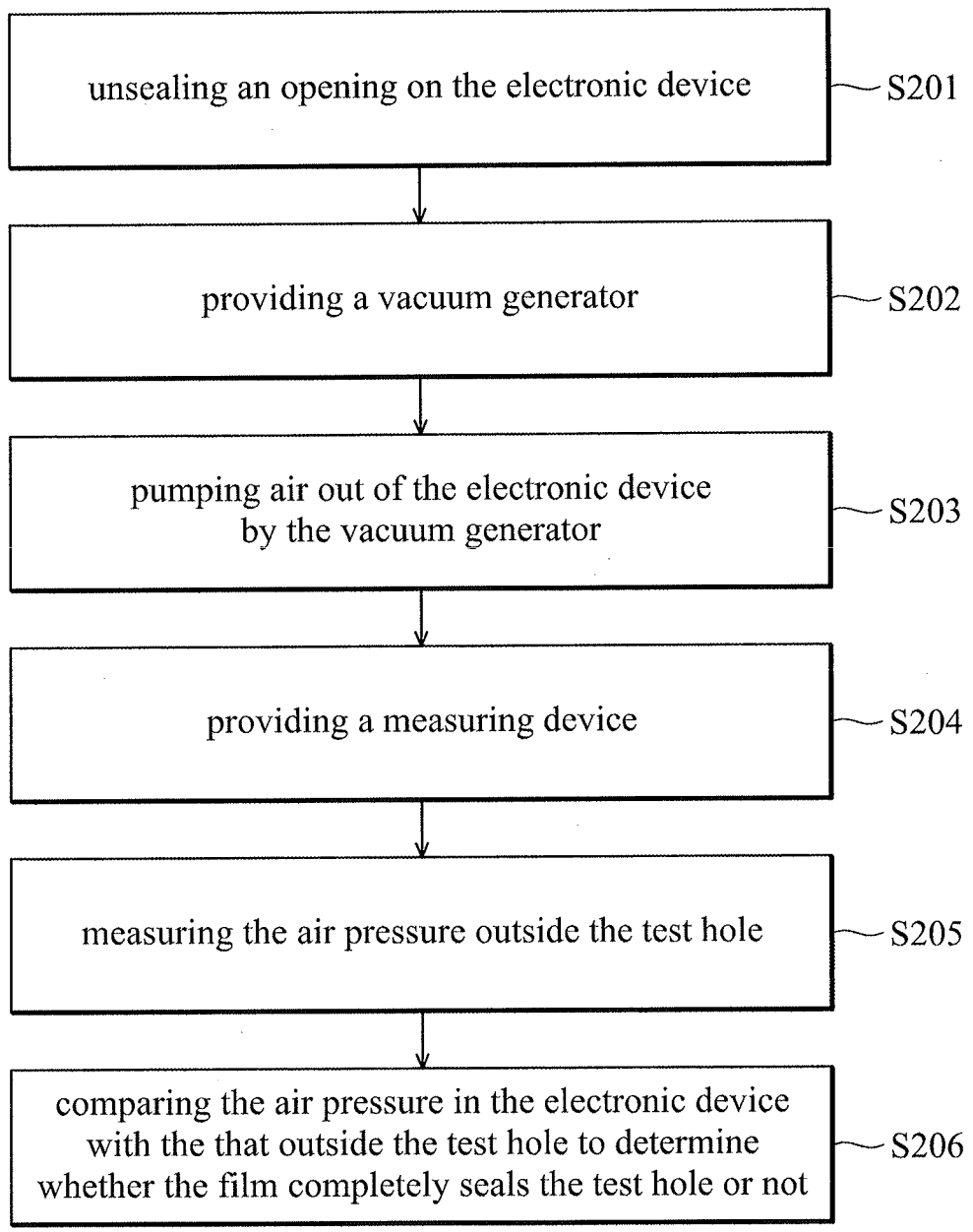
FIG. 6 is a flow chart of an inspection method according to another embodiment of the invention.

In another embodiment of the invention, the aforementioned inspection system can inspect whether the breathable film disposed on the test hole H of the electronic device E completely seals the test hole H or not. Referring to FIGS. 5 and 6, first, an opening O on the electronic device E can be unsealed (step S201), wherein the opening O communicates with the inner space of the electronic device E. The opening O may be a SIM card slot, memory card slot, or battery slot. Subsequently, a vacuum generator 100 is provided (step S202), and air is pumped out of the electronic device E through the test hole H with the film by this vacuum generator 100 (step S203). In an embodiment, the external air can be introduced into the vacuum generator 100 through an inlet port 110 (FIG. 5), and discharged from the vacuum generator 100 through an outlet port 120, such that the air in the electronic device E flows through a suction port 130 to the vacuum generator 100 due to the negative pressure formed in the vacuum generator 100. Furthermore, in an embodiment, an air pressure control unit 300 and a flow control unit 400 can also be provided (FIG. 5), wherein the air pressure control unit 300 connects to the inlet port 110 to control the pressure of the external air when entering the vacuum generator 100, and the flow control unit 400 is disposed between the electronic device E and the vacuum generator 100 to control the flow value of the air from the electronic device E to the vacuum generator 100.

Moreover, a measuring device 200 can be provided (step S204), and the air pressure outside the test hole H can be measured (step S205). Finally, the air pressure in the electronic device E (since the opening is open, the inner space of the electronic device E communicates with the external environment, such that the air pressure in the electronic device E is usually 1 atm) is compared with the air pressure outside the test hole H, to determine whether the film completely seals the test hole H or not (step S206). When the vacuum generator 100 pumps air out of the electronic device E, the air in the external environment continuously flows into the inner space of the electronic device E and is discharged through the test hole H. If the film tightly covers the test hole H and is not broken, some air can be resisted by the film when flowing through the test hole H. It should be noted that, if the air pressure in the electronic device E exceeds that outside the test hole H for a specific value, the film is deemed to have completely sealed the test hole H. If the difference obtained by subtracting the air pressure outside the test hole H from the air pressure in the electronic device E is less than specific value, the film is deemed not to have completely sealed the test hole H.

In summary, an inspection system and an inspection method for water resistance inspection of an electronic device is provided in the invention. The air in the electronic device is pumped out by the vacuum generator, such that the inspection system can be applied to electronic devices of different dimensions. Furthermore, another inspection method for determining whether a film on the test hole completely seals the test hole or not, such that the cost for inspection can be reduced, and the inspection efficiency can also be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An inspection method for water resistance inspection of an electronic device, comprising:
   providing a vacuum generator;
   pumping air out of the electronic device by the vacuum generator;
   providing a measuring device to measure an air pressure in the electronic device, wherein the step of measuring the air pressure in the electronic device comprises providing a connecting tube and connecting the measuring device to the connecting tube, wherein the connecting tube has a first end and a second end, the first end is connected to the vacuum generator, and the second end is tightly connected to a test hole of the electronic device
   disposing a solenoid valve between the electronic device and the vacuum generator;
   transmitting an electronic signal to the solenoid valve by the measuring device when the air pressure in the electronic device is less than the predetermined pressure value, wherein the solenoid valve closes to block air transfer between the electronic device and the vacuum generator according to the electronic signal, and the pumping of air out of the electronic device is stopped;
   measuring the air pressure in the electronic device by the measuring device after stopping the pumping of air out of the electronic device for a predetermined time as a first pressure value;
   calculating a pressure difference D by subtracting a second pressure value from the predetermined pressure value;
   calculating a pressure difference d by subtracting the second pressure value from the first pressure value; and
   determining whether the electronic device is waterproof or not according to the pressure differences D and d.

2. The inspection method as claimed in claim 1, wherein the vacuum generator comprises an inlet port, an outlet port, and a suction port that communicate with each other, and the step of pumping air out of the electronic device by the vacuum generator comprises:
   introducing external air into the vacuum generator through the inlet port, and discharging the external air from the vacuum generator through the outlet port, such that the air in the electronic device flows through the suction port to enter the vacuum generator due to a negative pressure formed in the vacuum generator.

3. The inspection method as claimed in claim 2, wherein the vacuum generator further comprises a check valve disposed in the suction port.

4. The inspection method as claimed in claim 2, wherein the inspection method further comprises:
   providing an air pressure control unit, connected to the inlet port to control the pressure of the external air entering the vacuum generator.

5. The inspection method as claimed in claim 4, wherein the second pressure value is 1 atm.

6. The inspection method as claimed in claim 1, wherein the inspection method further comprises:
   providing a flow control unit, disposed between the electronic device and the vacuum generator to control the flow rate of air from the electronic device to the vacuum generator.

7. The inspection method as claimed in claim 1, wherein the pressure difference D ranges from −10 kPa to −100 kPa, wherein the −10 kPa simulates a pressure at 1 meter under a water surface, and the −100 kPa simulates a pressure at 10 meters below the water surface.

8. The inspection method as claimed in claim 1, wherein the step of determining whether the electronic device is waterproof or not according to the pressure differences D and d comprises:
   determining that the electronic device is waterproof if the pressure difference d is less than 90% of the pressure difference D; and
   determining that the electronic device is not waterproof if the pressure difference d exceeds 90% of the pressure difference D.

9. An inspection system for a water resistance inspection of an electronic device, comprising:
   a vacuum generator, comprising an inlet port, an outlet port, and a suction port that communicate with each other, wherein the suction port connects to the electronic device;
   a measuring device for measuring an air pressure in the electronic device; and
   a solenoid valve, disposed between the electronic device and the vacuum generator, wherein external air is introduced into the vacuum generator through the inlet port and discharged from the vacuum generator through the outlet port, such that air in the electronic device flows through the suction port into the vacuum generator due to a negative pressure generated by the vacuum generator, wherein when the air pressure in the electronic device is less than a predetermined pressure value, the measuring device transmits an electronic signal to the solenoid valve, and the solenoid valve closes to block air transfer between the electronic device and the vacuum generator.

10. The inspection system as claimed in claim 9, wherein the inspection system further comprises a connecting tube having a first end and a second end, wherein the first end connects to the suction port, the second end detachably connects to the electronic device, and the measuring device and the connecting tube connect to each other.

11. The inspection system as claimed in claim 10, wherein a suction disc structure is formed on the second end.

12. The inspection system as claimed in claim 9, wherein the vacuum generator further comprises a check valve disposed in the suction port.

13. The inspection system as claimed in claim 9, wherein the predetermined pressure value minus 1 atm leaves a pressure difference D, the pressure difference D ranges from −10 kPa to −100 kPa, wherein the −10 kPa simulates the pressure at 1 meter below the water surface, and the −100 kPa simulates the pressure at 10 meters below the water surface.

14. The inspection system as claimed in claim 9, wherein the inspection system further comprises an air pressure control unit, connected to the inlet port to control the pressure of the external air entering the vacuum generator.

15. The inspection system as claimed in claim 9, wherein the inspection system further comprises a flow control unit, disposed in the connecting tube to control the flow rate of air from the electronic device to the vacuum generator.

* * * * *